C. B. EVANS.
CUSHION WHEEL.
APPLICATION FILED APR. 6, 1922.

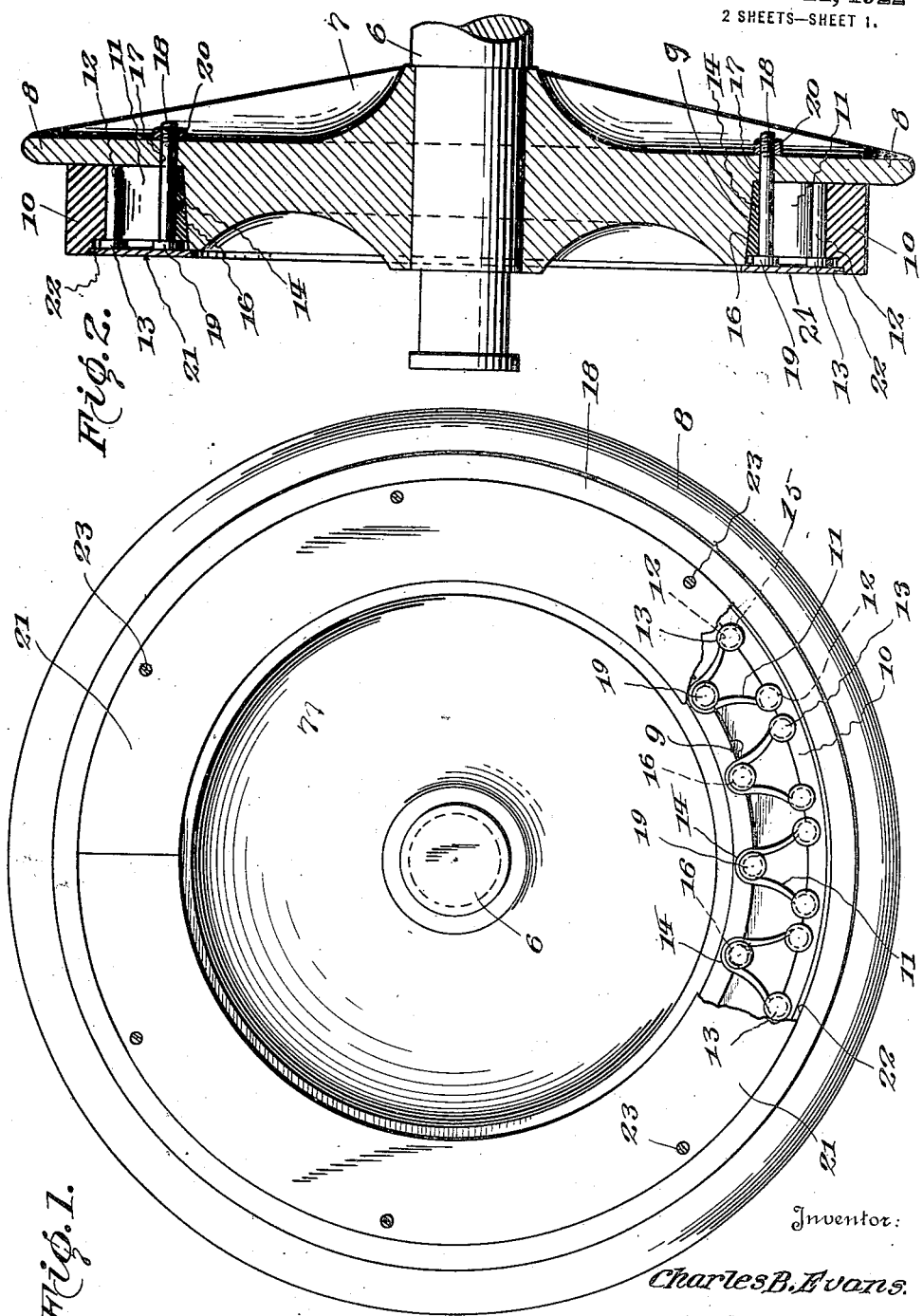

1,436,388.

Patented Nov. 21, 1922.
2 SHEETS—SHEET 2.

Inventor
Charles B. Evans

By
Attorneys

Patented Nov. 21, 1922.

1,436,388

UNITED STATES PATENT OFFICE.

CHARLES B. EVANS, OF CHICAGO, ILLINOIS.

CUSHION WHEEL.

Application filed April 6, 1922. Serial No. 550,037.

*To all whom it may concern:*

Be it known that I, CHARLES B. EVANS, a citizen of the United States, residing at Chicago, in the county of Cook and State of Illinois, have invented new and useful Improvements in Cushion Wheels, of which the following is a specification.

My invention relates to spring wheels and more particularly to such as are applicable to railway cars.

The invention has for its primary object, the provision of a wheel of the kind stated having a removably cushioned tire which will take up the shock occasioned when going over a crossing and which will also eliminate the accompanying noise peculiar to wheels of the solid type.

A further object of the invention is to provide a novel and improved fastening means for removably securing the tire to the wheel.

A still further object of the invention is to furnish a plurality of spring elements between the tire and the wheel, any of which may be readily and independently removed or replaced when broken without displacement of the tire or unfastening the same from the wheel.

Other objects and advantages of the invention will become more apparent as the description proceeds, and in order that the same may be better understood, reference is had to the accompanying drawings in which the preferred embodiment of the invention is disclosed.

In the drawings,

Figure 1 is a front elevation of my wheel, partly broken away to show the spring construction;

Fig. 2 is a central vertical cross-section through the same;

Figure 3:
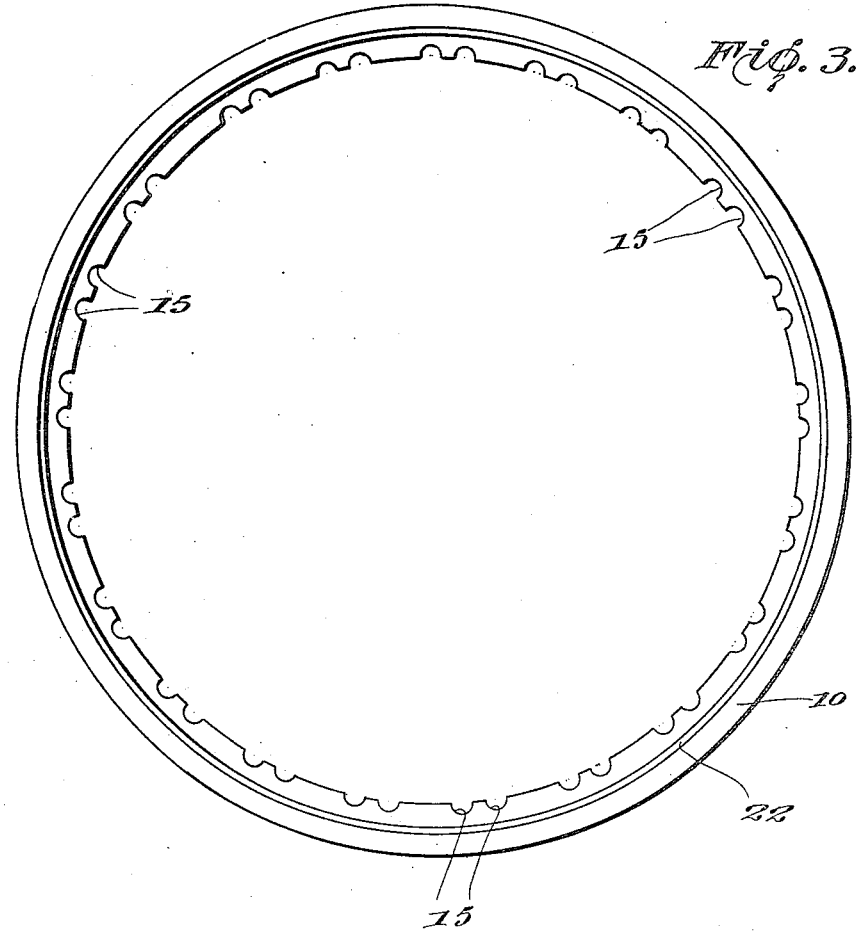
Fig. 3 is a side elevation of the tire removed.
Figure 4:
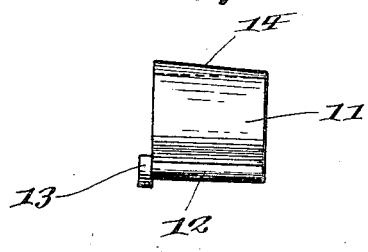
Fig. 4 is a side elevation of one of the springs removed.
Figure 5:
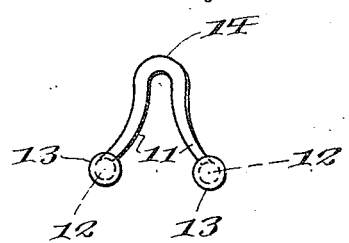
Fig. 5 is an end view thereof.

Referring specifically to the drawings, wherein like reference characters designate like parts throughout the several views, numeral 6 denotes a portion of a railway car axle of the conventional type carrying a wheel 7 having the usual circumferential flange 8 for engagement with the inside of the rail. The wheel except as hereinafter noted is of standard design and hence a detailed description thereof is unnecessary. At the base of the flange 8, at the inside thereof there extends a lateral circumferential shoulder 9 having spaced therefrom and concentric therewith an annular ring or tire 10 which is firmly clamped in contact with the flange 8 by a means to be presently described.

The tire 10 is spaced from the shoulder 9 by means of a circular series of arched springs 11 terminating in stems 12 which are headed as shown at 13. The arched portions 14 of the springs are thickened and wedge-shaped as best shown in Fig. 2. The tire 10 is formed with a series of transverse interior grooves 15 to receive the stems 12 of the springs 11 and against the outer edges of which grooves the headed stem ends 13 rest. The shoulder 9 is also provided with a series of transverse grooves or notches 16, these latter being of a wedge-shaped conformation to receive the wedge-shaped arched portions 14 of the springs. From the foregoing it will be seen that the tire may be firmly and securely clamped in position adjacent the flange 8 by means of bolts 18 extending through the arched portions 14 of the springs and through transverse apertures 17 of the flange 8, these bolts 18 being headed at 19 to engage the outer edges of the arched portions to wedge the same into the grooves 16 of the shoulder 9 and against the flange 8. The headed stem-ends 13 of the springs are thus caused to exert a pressure against the outer periphery of the tire 10 to hold it against the flange 8. The tension of the springs 11 and the weight of the car on the tire 10 will tend to keep the arched portions 14 and the stems 12 in their grooves 16 and 15 of the shoulder 9 and tire 10, respectively, and the position of the stem-heads 13 will therefore be effectually maintained against the outer periphery of the tire. The bolt-heads 19 will be held in position by the snug fitting of the bolts in the apertures 17 and by the clamping action of the nuts 20 on the threaded ends thereof.

Secured to the outer periphery of the tire 10 is an annular ring 21, the outer edge of which rests snugly against a circumferential shoulder 22 of said tire 10. This ring 21 may be fastened to the tire by means of machine screws 23 or other suitable fasteners, and its purpose is to cover the area between the tire 10 and the shoulder 9 to keep dust and other foreign matter from reaching the springs 11. It will be evident that by fastening the ring 21 to the tire 10, the ring will shift with the tire and slide against the shoulder 9 as the weight of the car shifts to different parts of the wheel to compress the springs 11 at such parts to bring the tire nearer the shoulder 9.

The foregoing description, read in connection with the accompanying drawings will make clear to those skilled in the art the construction and operation of my wheel and its advantages will be readily apparent. Should it be necessary to replace one of the springs 11 which has become broken, this may be expeditiously accomplished by removing the ring 21 and the bolt 18 of that particular spring. A new spring may then be substituted and the wheel made ready for use without removal of the tire 10 or displacing any of the other springs.

In accordance with the patent statutes I have shown my invention embodied in concrete form and as operating in a specified manner, but it should be understood that I do not limit myself thereto, since various modifications thereof will suggest themselves to those skilled in the art without departing from the spirit of my invention, the scope of which is set forth in the annexed claims.

Having thus described my invention, what I claim and desire to secure by Letters Patent, is:

1. A spring wheel comprising a body portion, a tire spaced from said body portion and concentric therewith, a series of vertically yieldable fastening elements carried by said body portion and disposed between said body portion and said tire, said fastening elements being movable to engage said tire to prevent lateral movement thereof with respect to said body portion, and each of said fastening elements being independently removable while said tire is in operating position upon said body portion.

2. A spring wheel comprising a body portion, a circumferential flange extending from said body portion, a lateral circumferential shoulder at the base of said flange, a tire spaced from said shoulder and concentric therewith, a series of vertically yieldable fastening elements carried by said flange and disposed between said shoulder and said tire, said fastening elements being movable to engage said tire to prevent lateral movement thereof from said flange and with respect to said body portion, and each of said fastening elements being independently removable while said tire is in operating position upon said body portion.

3. A spring wheel having a body portion, a circumferential flange extending from said body portion, a lateral circumferential shoulder at the base of said flange, a tire spaced from said shoulder and concentric therewith, a series of spring elements disposed between said shoulder and said tire, said spring elements having integral projections for engaging the outer edge of said tire, and means for clamping said spring elements to said flange.

4. A spring wheel comprising a body portion, a circumferential flange carried by said body portion, a lateral circumferential shoulder at the base of said flange, a tire spaced from said shoulder and concentric therewith, a series of vertically yieldable fastening elements carried by said flange and disposed between said shoulder and said tire, said fastening elements being movable to engage said tire to prevent lateral movement thereof from said flange and with respect to said body portion, each of said fastening elements being independently removable while said tire is in operating position upon said body portion, and an annular dust guard carried by said tire and transversely slidable against the outer circumferential edge of said shoulder.

5. A spring wheel having a body portion, a circumferential flange extending from said body portion, a lateral circumferential shoulder at the base of said flange, a tire spaced from said shoulder and concentric therewith, an annular dust guard carried by said tire, a series of spring elements disposed between said shoulder and said tire, said spring elements having integral projections for engaging the outer edge of said tire, and means for clamping said spring elements to said flange.

6. A spring wheel comprising a body portion, a circumferential flange extending from said body portion, a lateral circumferential shoulder at the base of said flange, said shoulder having a circumferential series of transverse grooves across the same, a tire spaced from said shoulder and concentric therewith, a series of spring elements disposed between said shoulder and said tire, and said spring elements having wedge-shaped portions fitting in the grooves of said shoulder and integral projections for gripping the outer edge of said tire, and means for clamping said spring elements to said flange.

7. A spring wheel comprising a body portion, a circumferential flange extending from said body portion, a lateral circumferential shoulder at the base of said flange, said shoulder having a circumferential series of transverse grooves across the same, a tire spaced from said shoulder and having a series of transverse grooves across its inner periphery, a series of spring elements disposed between said shoulder and said tire and fitting in the grooves of said tire and shoulder, said spring elements having integral projections for gripping the outer edge of said tire, and means associated with said spring elements and said flange for securing said tire to said flange in vertically yielding relation thereto.

In testimony whereof I affix my signature.

CHARLES B. EVANS.